(12) United States Patent
Liu et al.

(10) Patent No.: US 10,203,795 B2
(45) Date of Patent: Feb. 12, 2019

(54) TOUCH DISPLAY PANEL AND DRIVING METHOD OF TOUCH MODE

(71) Applicant: InnoLux Corporation, Miao-Li County (TW)

(72) Inventors: Tung-Kai Liu, Miao-Li County (TW); Jen-Chieh Peng, Miao-Li County (TW); Chia-Hao Tsai, Miao-Li County (TW); Chih-Hao Chang, Miao-Li County (TW); Bo-Feng Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 295 days.

(21) Appl. No.: 15/191,126

(22) Filed: Jun. 23, 2016

(65) Prior Publication Data

US 2017/0017340 A1    Jan. 19, 2017

Related U.S. Application Data

(60) Provisional application No. 62/193,787, filed on Jul. 17, 2015.

(30) Foreign Application Priority Data

Dec. 25, 2015    (TW) .............................. 104143744 A (51) Int. Cl.
*G06F 3/041*    (2006.01)
*G06F 3/044*    (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/0416; G06F 3/0412; G06F 3/044; G02F 1/13338; G02F 1/134336;
(Continued)

(56) References Cited

U.S. PATENT DOCUMENTS 8,390,582 B2    3/2013    Hotelling et al.
8,749,496 B2    6/2014    Chang et al.
(Continued)

FOREIGN PATENT DOCUMENTS

TW    201415124 A    4/2014
TW    201502675 A    1/2015

OTHER PUBLICATIONS

Chinese language office action dated Feb. 16, 2017, issued in application No. TW 104143744.

*Primary Examiner* — Robert Michaud
(74) *Attorney, Agent, or Firm* — McClure, Qualey & Rodack, LLP (57) ABSTRACT

A touch display panel capable of operating in a display mode and a touch mode. In the touch mode, a data line transmits a data voltage signal to a pixel electrode of the touch display panel, and a corresponding common electrode is at a constant voltage level. In the touch mode, the data line transmits a touch driving signal to the pixel electrode and then receives a touch sensing signal from the pixel electrode, and the corresponding common electrode is floating.

17 Claims, 11 Drawing Sheets

(51) Int. Cl.
*G09G 3/36* (2006.01)
*G06K 9/00* (2006.01)
*G02F 1/1333* (2006.01)
*G02F 1/1343* (2006.01)

(52) U.S. Cl.
CPC ....... *G06K 9/0002* (2013.01); *G06K 9/00026*
(2013.01); *G09G 3/3648* (2013.01); *G09G*
*3/3677* (2013.01); *G09G 3/3688* (2013.01);
*G09G 3/3696* (2013.01); *G02F 1/13338*
(2013.01); *G02F 2001/134372* (2013.01);
*G09G 2300/0809* (2013.01); *G09G 2310/0202*
(2013.01)

(58) Field of Classification Search
CPC ............ G02F 1/136286; G06K 9/0002; G09G
3/3648; G09G 3/3677
See application file for complete search history.

(56) References Cited

U.S. PATENT DOCUMENTS

| | | |
|---|---|---|
| 8,766,950 B1 | 7/2014 | Morein et al. |
| 9,164,633 B2 | 10/2015 | Chen et al. |
| 9,323,406 B2 | 4/2016 | Chen et al. |
| 2010/0194699 A1 | 8/2010 | Chang |
| 2012/0050216 A1 | 3/2012 | Kremin et al. |
| 2012/0162584 A1 | 6/2012 | Chang et al. |
| 2012/0169660 A1* | 7/2012 | Seo ............... G06F 1/3262 345/174 |
| 2013/0044074 A1 | 2/2013 | Park et al. |
| 2013/0342498 A1 | 12/2013 | Kim et al. |
| 2014/0104228 A1* | 4/2014 | Chen ............... G06F 3/044 345/174 |
| 2014/0118299 A1 | 5/2014 | Wang et al. |
| 2014/0225838 A1 | 8/2014 | Gupta et al. |
| 2014/0333328 A1* | 11/2014 | Nelson ............ G06F 3/044 324/663 |

* cited by examiner

TOUCH DISPLAY PANEL AND DRIVING METHOD OF TOUCH MODE

CROSS REFERENCE TO RELATED APPLICATIONS

This application claims the benefit of U.S. Provisional Application No. 62/193,787, filed on Jul. 17, 2015, the entirety of which is incorporated by reference herein.

This Application claims priority of Taiwan Patent Application No. 104143744, filed on Dec. 25, 2015, the entirety of which is incorporated by reference herein.

BACKGROUND OF THE INVENTION

Field of the Invention

The present invention relates to a touch display panel and a driving method thereof, and in particular to a touch display panel capable of providing a normal touch function and a fingerprint identification function and a driving method of its touch mode.

Description of the Related Art

Touch-in display (TID) panel is a new type of display panel integrated with the touch function. Touch-in display panels of capacitive pattern may be classified as either mutual-capacitive type or self-capacitive type, depending on how the touch driving signals and the touch sensing signals are delivered in panels. TID of mutual-capacitive type has a path to send the touch driving signals and another path to receive the touch sensing signals. Oppositely, TID of self-capacitive type sends the touch driving signals and receives the touch sensing signals only in a path. Generally, in a conventional self-capacitive type, the common electrode is divided into a plurality of electrode blocks which are collocated as a block matrix of common electrode. Besides sending common signals in a display period, each electrode block is used as a touch sensing electrode in a touch period. The position of a touch object is determined by detecting the formation of a capacitance between the touch sensing electrode and the touch object.

The plurality of electrode blocks collocated in a matrix are connected to a driving chip via a respective metal wire of each block. The metal wire and other wiring circuits induce coupling capacitances therebetween. From the driving chip, the delivery signals get distortion and noise due to the coupling capacitances, so that the accuracy of touch sensing is decreased on the far side. In addition, the area of the electrode block is large. Such that the electrode blocks are utilized in touch sensing of normal operation, not of precise operation such as fingerprint identification.

In view of these problems, the invention provides a touch display panel and a driving method, dedicating to reduce coupling capacitances, not only in a normal touch function but also in a fingerprint identification function.

BRIEF SUMMARY OF THE INVENTION

A detailed description is given in the following embodiments with reference to the accompanying drawings.

According to an embodiment, a touch display panel including a plurality of pixels disposed in an active area (AA) of the display. The pixel scheme includes: a pixel electrode, a first switching element connected between the pixel electrode and a data line, and a common electrode corresponding to the pixel electrode and connected to a common electrode line. In a display mode, the data line delivers a display signal to the pixel electrode via the first switching element, and the common electrode line delivers a first level of voltage to the common electrode, wherein the first voltage level is a constant value. In a touch mode, the data line delivers a touch driving signal to the pixel electrode via the first switching element and receives a touch sensing signal from the pixel electrode, and the common electrode is a second level of voltage, wherein the second voltage level is floating.

According to an embodiment, the touch display panel further includes a plurality of first gate lines connected to the first switching elements of the corresponding pixels. The display area comprises a plurality of sub-areas, and each sub-area comprises a plurality of first gate lines. In the touch mode, there are three scanning patterns of first gate lines. The first gate lines in the display area are scanned sequentially, or the sub-areas are driven independently and the first gate lines in each sub-area are scanned sequentially, or the sub-areas are driven independently and the first gate lines in each sub-area are scanned simultaneously.

According to an embodiment, a driving course of a touch mode to drive the touch display panel. The driving course includes selective activations either a touch function or a fingerprint identification function. When the touch function is activated, the sub-areas are driven independently and the first gate lines in each sub-area are scanned simultaneously. When the fingerprint identification function is activated, the first gate lines in the display area are scanned sequentially, or the sub-areas are driven independently and the first gate lines in each sub-area are scanned sequentially According to the embodiments, a touch display panel and a driving course of its touch mode, not only in a normal touch function but also in a fingerprint identification function. Furthermore, it is able to reduce coupling between the touch sensing electrodes and other wiring circuits.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken as a limitation. The scope of the invention is best determined by reference to the appended claims.

Figure 1:
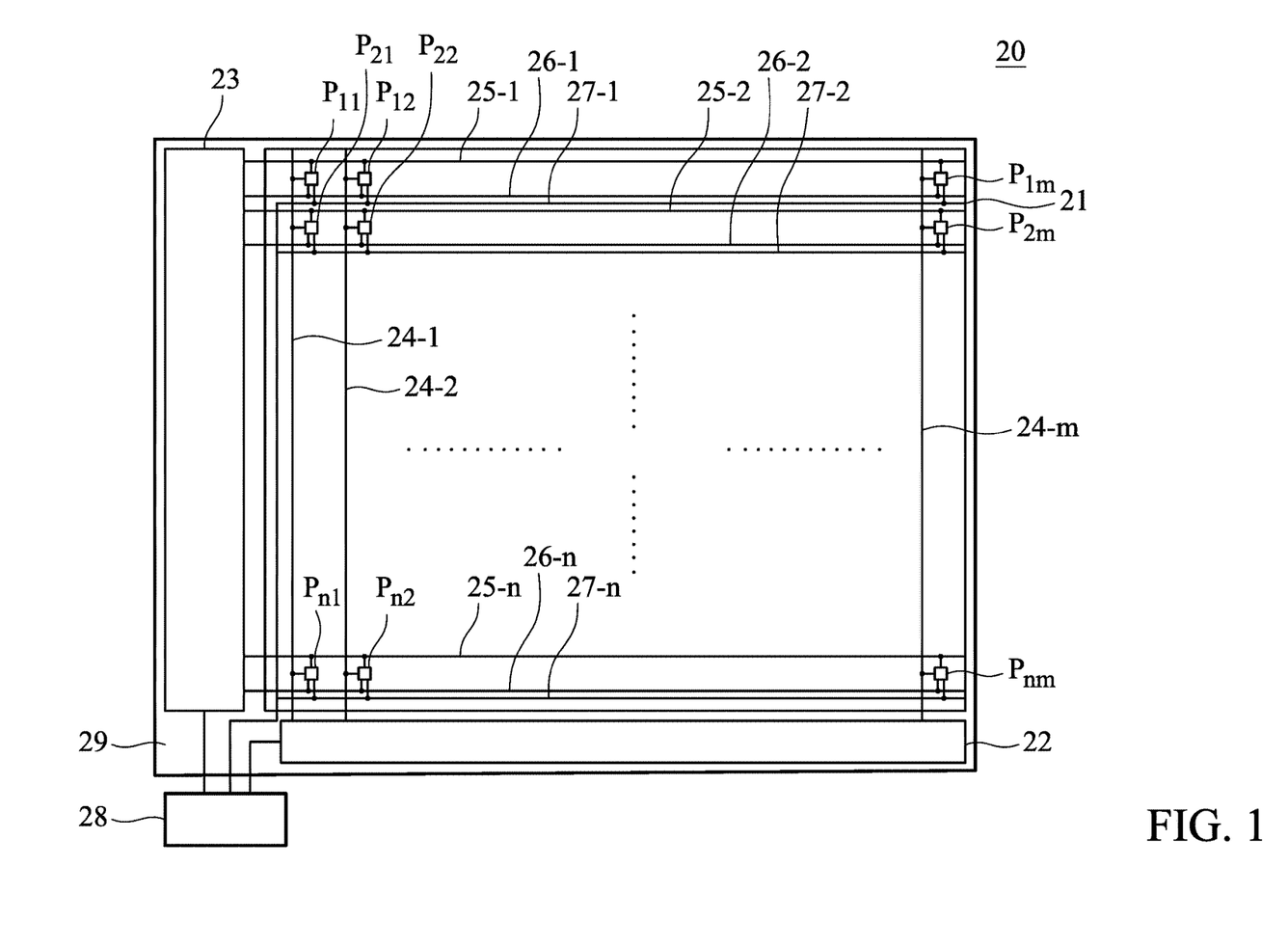
FIG. 1 is a schematic top view of a touch display panel in accordance with an embodiment of the invention.

FIG. 1 is a schematic top view of a touch display panel in accordance with an embodiment of the invention. A touch display panel 20 shown in FIG. 1 has a display area 21 and a peripheral area 29 located outside of active area 21 of display. A data driving circuit 22 and a gate driving circuit 23 are disposed on the peripheral area 29. The data driving circuit 22 and the gate driving circuit 23 are connected to a touch display control circuit 28. In this embodiment, the gate driving circuit 23 is disposed at one side of the display area 21, but in some embodiments, the gate driving circuit 23 can be disposed at two sides of the display area 21 both. In this embodiment, the touch display control circuit 28 is located outside of the peripheral area 29, but in some embodiments, the touch display control circuit 28 can be located on the peripheral area 29. Furthermore, in some embodiments, the touch display control circuit 28 can be integrated with the data driving circuit 22 or the gate driving circuit 23, or the three circuits can be integrated into a circuit. The touch display panel 20 has a plurality of pixels P11~Pnm (m and n are integers) disposed on the active area 21 of display. The display panel 20 includes a plurality of data lines 24-1~24-m connected to pixel columns, a plurality of gate lines 25-1~25-n connected to pixel rows, a plurality of sub-gate lines 26-1~26-n connected to the pixel rows, and a plurality of common electrode lines 27-1~27-n connected to the pixel rows. The data driving circuit 22 can drive the data lines 24-1~24-m. The gate driving circuit 23 can drive the gate lines 25-1~25-n and the sub-gate lines 26-1~26-n. The common electrode lines 27-1~27-n are connected to the touch display control circuit 28 to receive a common voltage signal. Generally, a pixel of a display panel has three sub-pixels displaying three colors respectively. In the specification, the term "pixel" means a sub-pixel which displays a single color.

Figure 2:
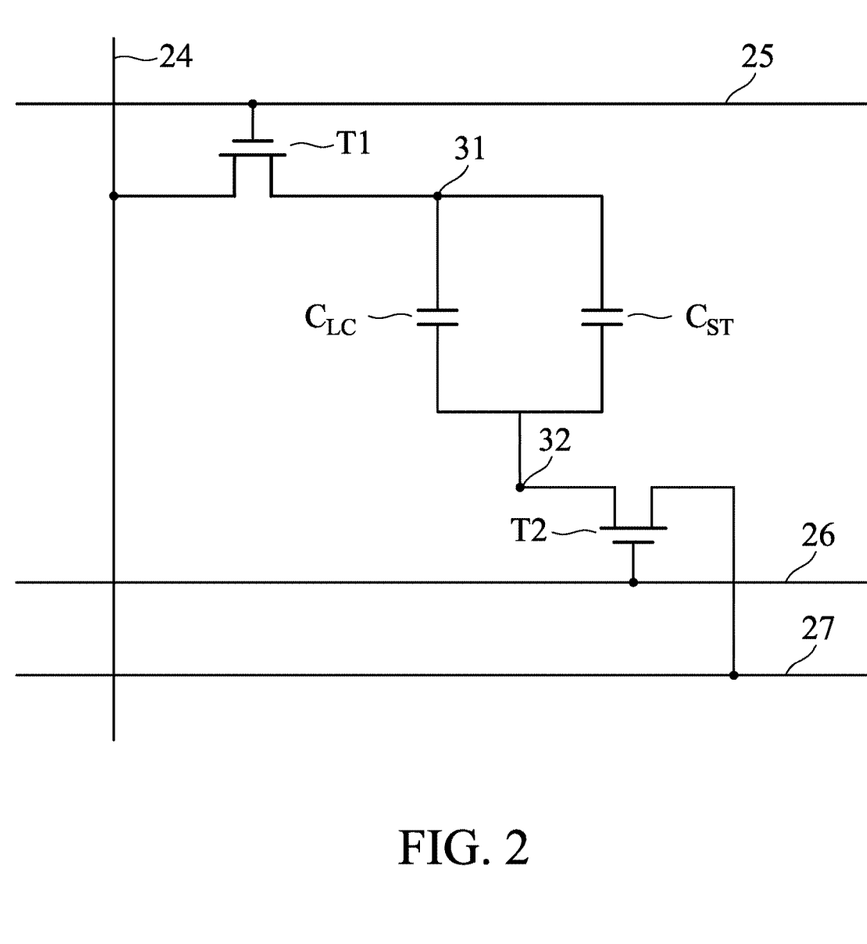
FIG. 2 is a schematic circuit diagram of a pixel of the touch display panel in accordance with an embodiment of the invention.

FIG. 2 is a schematic circuit diagram of a pixel of the touch display panel in accordance with an embodiment of the invention. A pixel (precisely speaking, a sub-pixel) of the invention includes pixel electrode 31, a first switching element T1, a liquid-crystal displaying element $C_{LC}$, a storage capacitor Cst, a common electrode 32, and a second switching element T2. The first switching element T1 and the second switching element T2 are, for example, thin film transistors. In FIG. 2, the liquid-crystal displaying element $C_{LC}$ is represented by a capacitor connected between the pixel electrode 31 and the common electrode 32. The storage capacitor Cst is also a capacitor connected between the pixel electrode 31 and the common electrode 32. The first switching element T1 is disposed between the pixel electrode 31 and the data line 24 and its control terminal (gate) is connected to the gate line 25. The second switching element T2 is disposed between the common electrode 32 and the common electrode line 27 and its control terminal (gate) is connected to the sub-gate line 26.

Figure 3A:
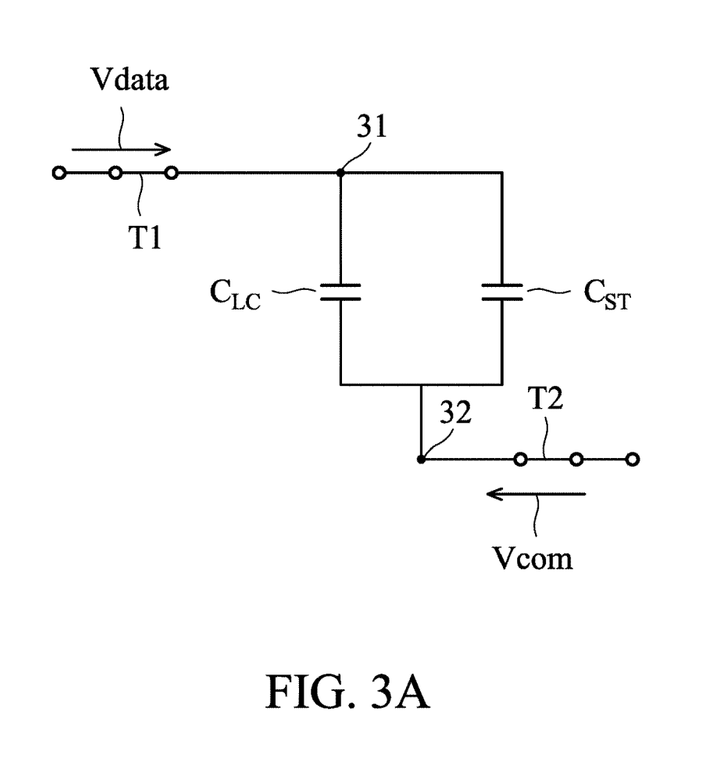
FIG. 3A is a diagram showing that the pixel shown in FIG. 2 is operating in the display mode.
Figure 3B:
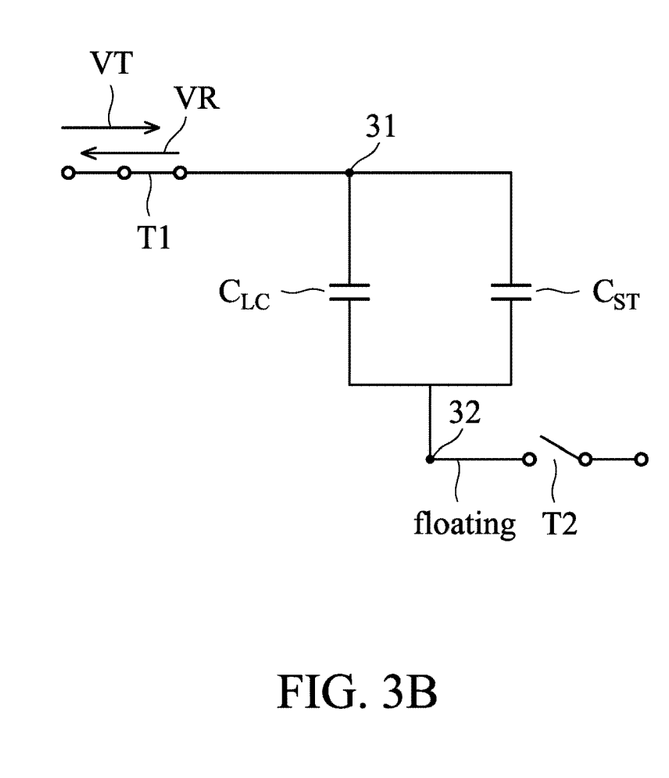
FIG. 3B is a diagram showing that the pixel shown in FIG. 2 is operating in the touch mode.

In the following paragraph, the driving operations of the pixel in a display mode and a touch mode are described. FIG. 3A is a diagram showing that the pixel shown in FIG. 2 is operating in the display mode. FIG. 3B is a diagram showing that the pixel shown in FIG. 2 is operating in the touch mode. As shown in FIG. 3A, when the pixel is operating in the display mode, the second switching element T2 is turned on and the common electrode 32 is electrically conducted with the common electrode line 27. The common electrode line 27 delivers a constant common voltage (Vcom) to the common electrode 32. In the meantime, the first switching element T1 is turned on and the pixel electrode 31 is electrically conducted with the data line 24. The data line delivers a display data signal (Vdata) to the pixel electrode 31 to display the vivid images. As shown in FIG. 3B, when the pixel is operating in the touch mode, the second switching element T2 is turned off and the common electrode 32 is isolated abruptly from the common electrode line 27. The common electrode 32 is floating. In the meantime, the first switching element T1 is turned on and the pixel electrode 31 is electrically conducted with the data line 24. The data line delivers a touch driving signal (VT) to the pixel electrode 31 and then receives a touch sensing signal (VR) from a sensing result of the pixel electrode 31 which is touched, or not.

In the above driving method, each pixel electrode 31 delivers the touch driving signal VT and then receives the touch sensing signal VR. Therefore, in the touch mode, the pixel electrode 31 functions as a touch sensing electrode which is the smallest unit for touch sensing. A fine pitch of the touch sensing operation can increase the resolution of the touch sensing, because of the sensing area of the pixel electrode smaller than that of a common electrode block used as a touch sensing electrode in the conventional art. In addition, when the display signal Vdata is input to the pixel electrode 31 via the data line 24, the common electrode 32 sustains at the constant common voltage Vcom. In the meantime, the voltage difference between the pixel electrode 31 and the common electrode 32 controls the liquid-crystal displaying element $C_{LC}$ to display a specific gray level. When the display mode is switched to the touch mode, the common electrode 32 is floating which means the voltage level is not constant. Thus, even though the touch driving signal VT and the touch sensing signal VR are input to the pixel electrode 31 via the data line 24 and then change the voltage of the pixel electrode 31, the voltage difference between the pixel electrode 31 and the common electrode 32 is not changed because of coupling effects. The liquid-crystal displaying element $C_{LC}$ can still be sustained to display the original gray level. Touch operations does not influence the displayed image.

Figure 4:
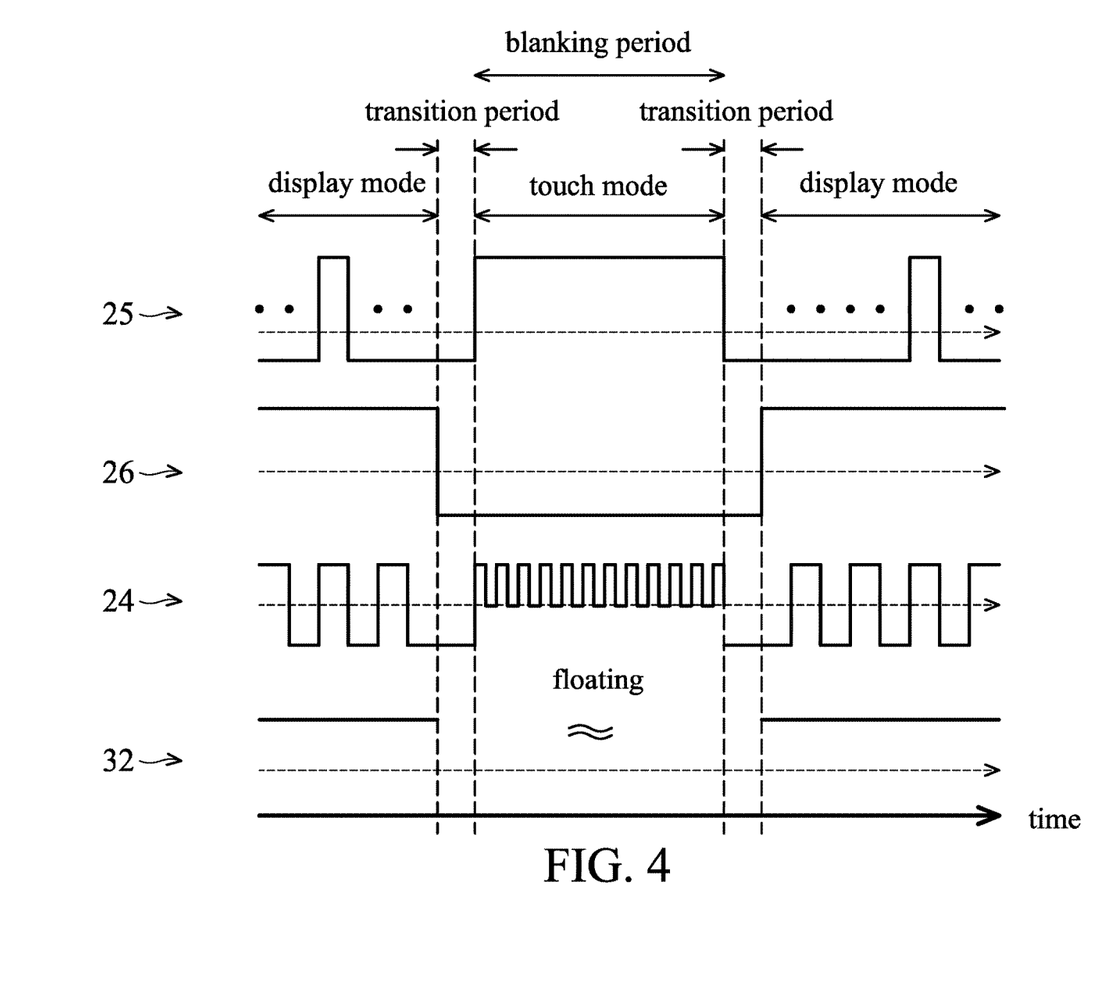
FIG. 4 is a sequent timing diagram of the pixel, shown in FIG. 2, in the display mode and the touch mode.

FIG. 4 is a sequent timing diagram of the pixel, shown in FIG. 2, in the display mode and the touch mode. It is assumed that the first switching element T1 and the second switching element T2 are turned on when their control terminals are at a high voltage level and turned off when their control terminals are at a low voltage level (for example, the first switching element T1 and the second switching element T2 are NMOS transistors). However, in other embodiments, the switching elements can be turned on when their control terminals are at a low voltage level and turned off when their control terminals are at a high voltage level (for example, the first switching element T1 and the second switching element T2 are PMOS transistors). As shown in FIG. 4, the voltage level of the gate line is switched between a high voltage level and a voltage level. When the gate line 25 is at the high voltage level, the first switching element T1 is turned on and then the display data signal Vdata is delivered into the pixel electrode 31. When the gate line 25 is switched to at the low voltage level, the first switching element T1 is turned off and the pixel electrode 31 sustains the voltage of the display data signal Vdata. In the display mode, the sub-gate line 26 keeps the high voltage level and thus the second switching element T2 become turned-on state to deliver constant common voltage Vcom into the common electrode 32.

In the touch mode, it is assumed that the gate lines are divided by specific areas and then gate lines in a specific area are scanned simultaneously (The other patterns of the gate scanning are described later). In the meanwhile, the gate line 25 is at the high voltage level to turn on the first switching element Ti and then the data line 24 delivers several touch driving signals VT and receives several touch sensing signals VR. In FIG. 4, the touch driving signals VT and the touch sensing signals VR are shown with the frame of pulses that have an amplitude smaller than the display data signal and a frequency higher than the display data signal. During this period, the sub-gate line 26 keeps at the low voltage level to turn off the second switching element T2 and common electrode 32 is floating.

The interval between two adjacent display modes is a blanking period. The touch mode can be assigned in the blanking period and there is a transition period between the touch mode and the display mode. During the transition period, the sub-gate line 26 is switched from the high voltage level to the low voltage level and thus the second switching element T2 is turned off to make the common electrode 32 being floating. The data line 24 is silence during this period.

In the usage of the above driving method, the invention utilizes the data line 24 to charge or discharge the pixel electrode 31 to sense the touch position while the common electrode 32 is floating. In the embodiment shown in FIGS. 1~4, each pixel has a second switching element T2 to control the voltage level of the common electrode 32. However, many of the second switching elements T2 can be integrated together and disposed to any location outside the pixel. For example, pixels in a row can has only one second switching element T2 and that second switching element T2 is located at any position in the display area or in the peripheral area 29. In addition, if the touch display control circuit 28 which delivers signal to the common electrode line 27 also has an ability to make the common electrode line 27 being floating, the second switching element T2 and the sub-gate line 26 can be omitted.

Figure 5A:
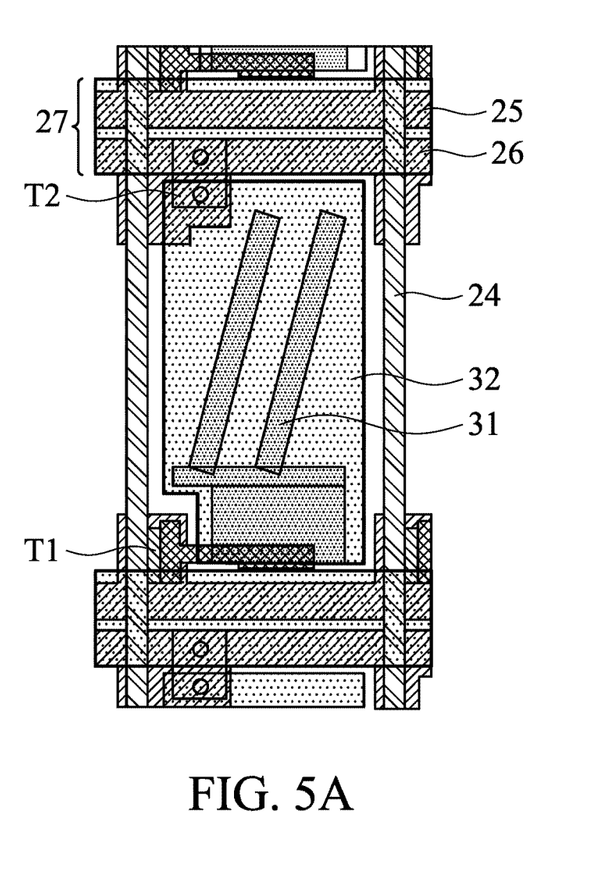
FIG. 5A is a schematic top view of a pixel with a top pixel electrode structure in accordance with an embodiment of the invention.
Figure 5B:
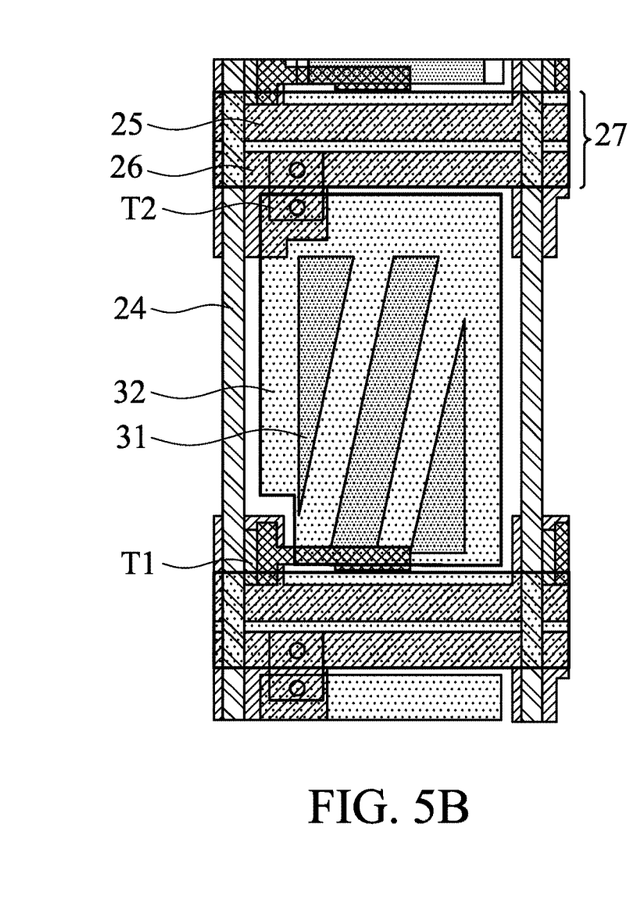
FIG. 5B is a schematic top view of a pixel with a top common electrode structure in accordance with an embodiment of the invention.

The touch display panel of the invention can adopt a fringe field switching (FFS) structure in which the pixel electrode 31 and the common electrode 32 are disposed at the same substrate. The FFS structure may be a top pixel electrode type (the pixel electrode is near to the liquid-crystal layer and the common electrode is near to the thin film transistor layer) or a top common electrode type (the common electrode is near to the liquid-crystal layer and the pixel electrode is near to the thin film transistor layer). Under the structure of the top pixel electrode type, the pixel electrode 31 is not shielded by the common electrode 32, so the pixel electrode 31 can directly sense the touch object. Under the structure of the top common electrode type, the pixel electrode 31 is shielded by the common electrode 32 from the touch object. However, the pixel electrode 31 can still sense the touch object because the common electrode 32 is floating in the touch mode and the voltage level of the common electrode 32 is changed in synchronization with the pixel electrode 31 due to coupling effects. FIG. 5A is a schematic top view of a pixel with a top pixel electrode structure in accordance with an embodiment of the invention. FIG. 5B is a schematic top view of a pixel with a top common electrode structure in accordance with an embodiment of the invention. Whether the top pixel electrode structure or the top common electrode structure, the invention has the same feature that an individual and independent common electrode 32 exists in each pixel. During the touch mode, the common electrode 32 of each pixel can keep a floating state independently. Thus, a pixel can be used as the smallest touch sensing unit. In addition, the overlapping ratio of one of the pixel electrode and the common electrode 32 and one of the data line 24, the gate line 25, the sub-gate line 26, and the common electrode line 27 in the horizontal and vertical direction is decreased at which the common electrode 32 is singular in each pixel. Therefore, the coupling effects between the touch sensing electrode and other wires are reduced and increase the signal-to-noise ratio of the touch sensing.

Next, the scanning patterns of the touch display panel in the touch mode are described. The invention provides three scanning patterns: a first scanning pattern, a second scanning pattern, and a third scanning pattern.

The first scanning pattern is that the gate lines 25 are scanned from top to bottom sequentially (that is, from the gate line 25-1 to the gate line 25-n by row to row). During the period when the gate lines 25 are scanned sequentially, the data driving circuit 22 delivers the touch driving signal VT to the pixel electrode 31 via the data line 24 and then receives the touch sensing signal VR from the pixel electrode via the data line 24 to complete the scanning operation of a touch point. This scanning pattern can scan all touch points in the display area 21 sequentially. Because each pixel is a touch sensing unit, the fingerprint identification which needs finer touch sensing can be performed in applications, such as multiple fingerprint scanning or palmprint scanning. However, this scanning pattern implies a longer scanning time of the fingerprint identification, so it is appropriately used for the startup or other special images of the display of touch products. In this period, the timing of touch products entirely support the touch sensing as a result of the rest of displaying images.

In the second scanning pattern, the active area 21 of display 20 is divided into a plurality of areas (for example 20~30 areas, not a limitation) in the column direction in advance. The number of gate lines 25 in an area is not limited and are able to be one or more than one gate. The operation of the touch sensing is performed by sequentially scanning the gate lines 25 in a selected area. As a result of the scanning of the gate lines in the selected area, the scanning time is short more than that of the first scanning pattern. That is, the fingerprint identification can be performed in the selected area because of the row by row scanning of the gate lines. Notably, the scanning area of the fingerprint can be selected in advance. For example, the image can show up a specific block to inform the user where the fingerprint identification processes before starting to use the touch display panel. In other embodiment, second scanning pattern is also used to scan a area where the touch objective locates. But, it is necessary to use the third scanning pattern to get the location of the touch objective in advance. A comprehensive scanning method is used by combining the second scanning pattern and the third scanning pattern in this case.

Figure 6:
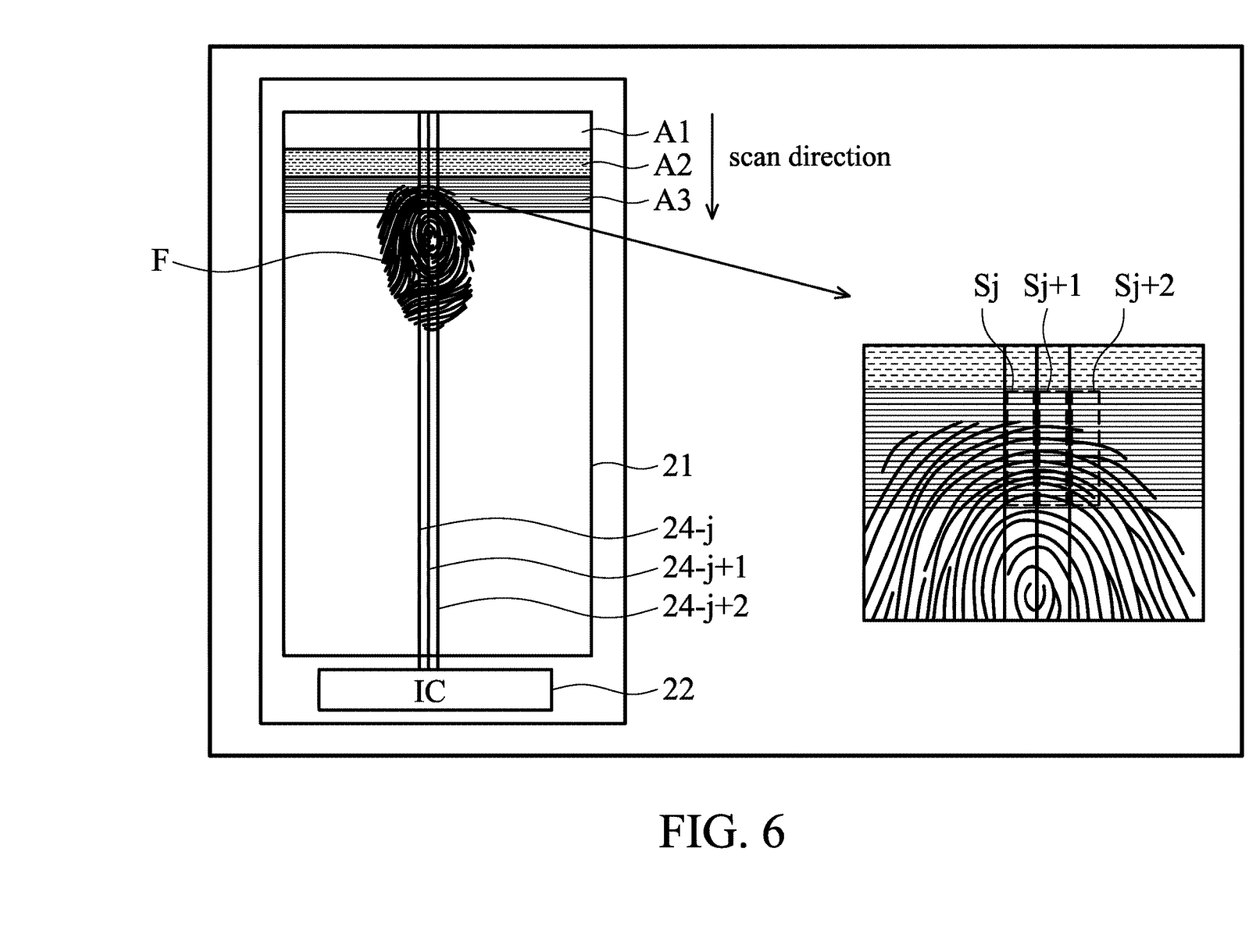
FIG. 6 is a diagram showing that the touch sensing operation is performed with the third scanning scheme of the invention.

In the third scanning pattern, the display area 21 is divided into a plurality of areas (for example 20~30 areas, not a limitation) in the column direction in advance. The operation of the touch sensing is complemented by scanning all of the gate lines in an area, when all of the first switching elements Ti in the area turn on simultaneously. Notably, the difference between the second scanning pattern and the third scanning pattern is the scanning type in one of the divided areas. FIG. 6 is a operation diagram of the three scanning pattern of the invention. In FIG. 6, the reference sign F indicates the touch range of a finger. The display area 21 is divided to sub-areas of A1, A2, A3, . . . from the top to the bottom of the touch panel. Next, sub-area A1, A2, A3, . . . is scanned sequentially for touch sensing. Take sub-area A3 as an example. Touch objective at sub-area A3 is sensed when the gate lines 25 of sub-area A3 is turn-on simultaneously. At this time, an effective touch sensing units are, for example, the dotted line box Sj, Sj+1, or Sj+2 in the enlarged view in FIG. 6. The touch sensing unit Sj corresponds to the pixels located in the sub-area A3 and connected to the data line 24-j. Similarly, the touch sensing unit Sj+1 corresponds to the pixels located in the sub-area A3 and connected to the data line 24-j+1, and the touch sensing unit Sj+2 corresponds to the pixels located in the sub-area A3 and connected to the data line 24-j+2. In the third scanning pattern, the area of an effective touch sensing unit is bigger than in the other scanning pattern, so the third scanning scheme is appropriately utilized to perform the normal touch function. In addition to the operation of the touch sensing on a sequent areas from top to bottom, the operation of the touch sensing can be complemented with the random collocation of sub-areas, or the operation of the touch sensing can be performed on one or more than one specific sub-area only.

In the third scanning pattern, the plurality of gate lines 25 and the plurality of data lines 24 can be activated sequentially to transmit the touch driving signals VT and then receive the touch sensing signals VR for the multi-touch function.

Figure 7:
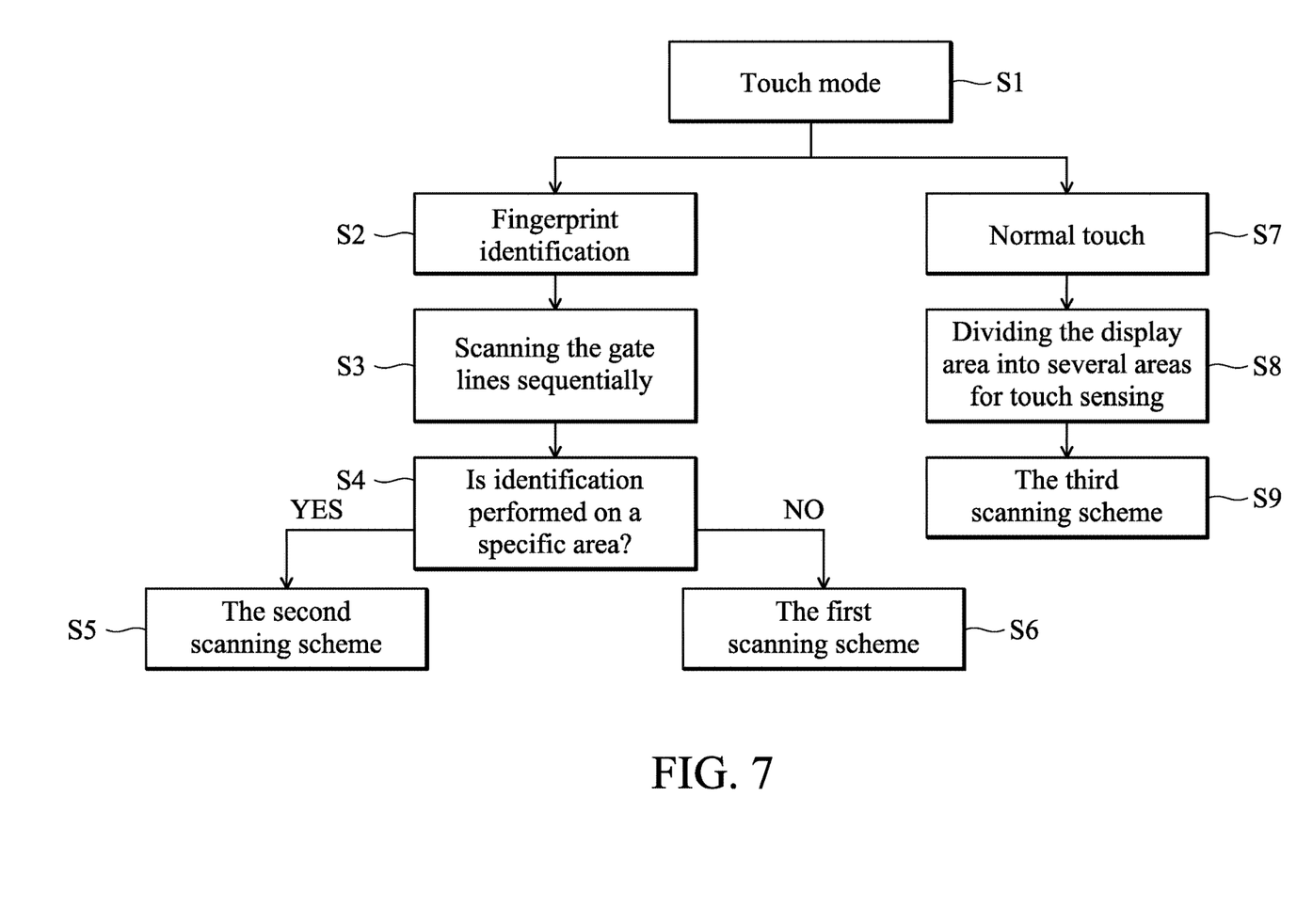
FIG. 7 is a flowchart showing how to choose a scanning scheme for the touch display panel of the invention.

As shown in the timing chart of FIG. 4, the touch display panel progresses into the touch mode in the period between the display modes. In the following paragraph, a process flow to choose one of the above three scanning pattern of the touch mode is described in detail. FIG. 7 is a flowchart showing how to choose a scanning pattern for the touch display panel of the invention. In step S1, the touch display panel processes a selection of the touch functions by the driven IC system. The touch display panel can enter into fingerprint identification (step 2) or alternatively go to normal touch (step 7). When the driven IC system executes the fingerprint identification function (step S2), the gate lines 25 shall be scanned sequentially (step S3). Then, the driven IC system determines whether the fingerprint identification is implemented on a specific area (step S4). If the answer of the recursive judge is yes, the second scanning pattern is adopted to sequentially scan the gate lines in a specific area (step S5). If the answer of the recursive judge is no, the first scanning pattern is adopted to sequentially scan the gate lines in the entire active area of the display (step S6). Similarly, when the driven IC system executes the normal touch function (step S7), fine touch sensing is unnecessarily adopted so that the display area is divided into several areas for touch sensing (step S8). The third scanning pattern is processed after the recursive judge. That is, the gate lines in the area are scanned simultaneously (step S9) when the operation of the touch sensing is executed on an area.

Recursive loop of appropriately choosing the scanning pattern from the three scanning patterns is described above, it is obvious that the invention provides not only a normal touch function, rough scanning, but also a fingerprint identification function, fine scanning.

Figure 8A:
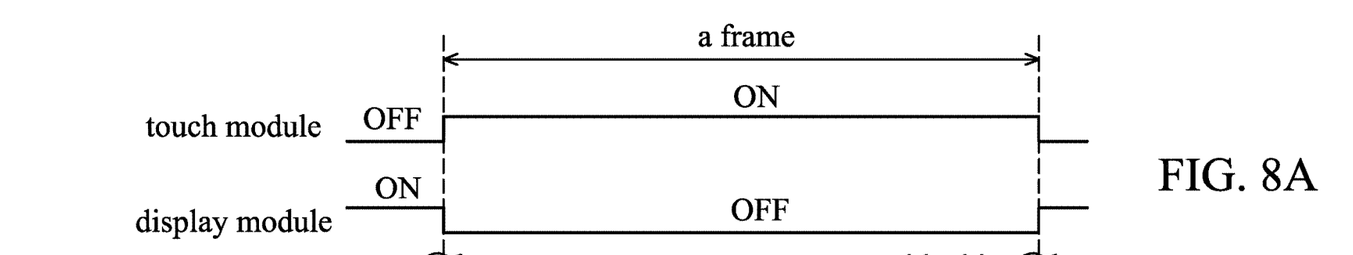
FIGS. 8A~8C are sequence diagrams showing operations of the touch module and the display module of the invention.
Figure 8B:
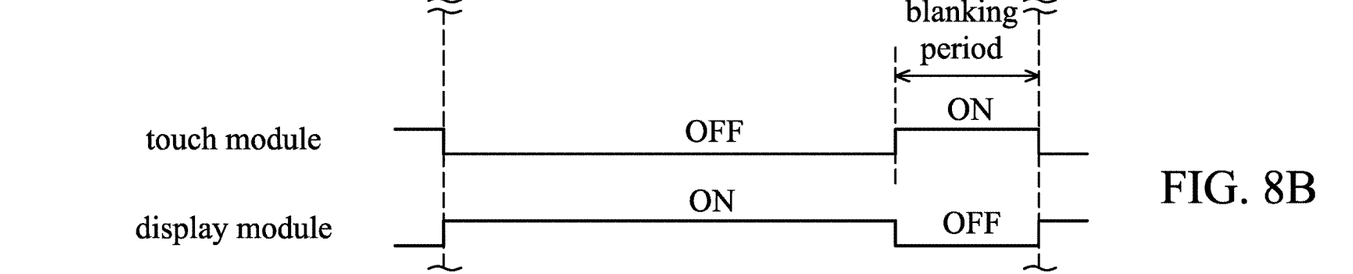
Figure 8C:
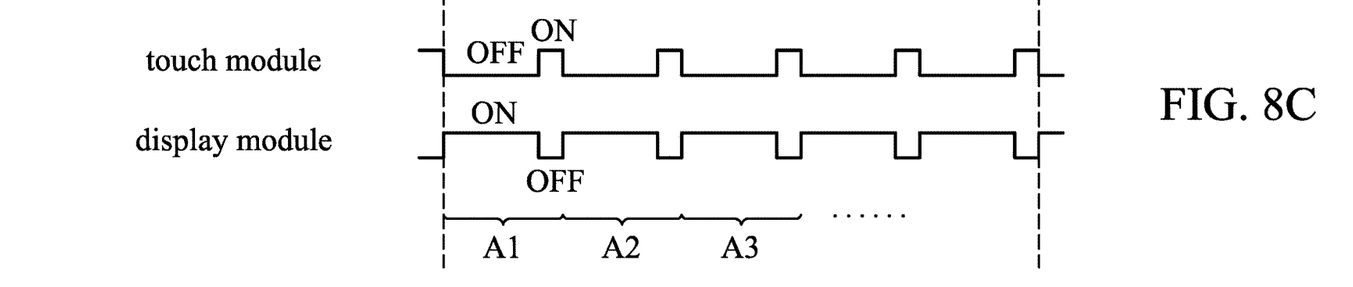

FIG. 4 shows that the touch mode is implemented while the display period is suspended, though. But, it doesn't show a more specific relationship in time. In order to understand the relationship completely, the relationship in time between the touch mode and the display mode is described in FIG. 8. FIGS. 8A~8C are sequent timing diagrams of showing the operations of the touch mode and the display mode of the invention. Because of different operation time and characteristics of the three scanning patterns, three timing routes of the touch mode and the display mode can be described in FIGS. 8A~8C. In the timing routes, the high level (ON) and the low level (OFF) mean the mode being active and inactive, respectively. The touch display device is driven at 60 Hz and thus a frame is equal to 16.6 ms for an example, but not a limitation in the invention. First, as shown in FIG. 8A, the touch mode processes the first scanning pattern. A frame period is used only in the touch mode and the display mode is not enforced in the frame, because of a long operation time of the first scanning pattern that sequentially scans the gate lines of the entire panel. In other embodiments, one or more than one frame can be used to execute the first scanning pattern. Secondly, as shown in FIG. 8B, the touch mode is executed in a blanking period at which the display area is not driven in the frame. In this case, the touch mode of the second and third scanning patterns is utilized to scan the gate lines in one divided area at least. Notably, the second and third scanning patterns scan the gate lines sequentially and simultaneously, respectively. Thirdly, as shown in FIG. 8C, both the display mode and the touch mode are separately executed in the frame when the active area of the display is divided into, from top to bottom of the display, sub-areas A1, A2, A3, . . . , as shown in FIG. 6. In this case, the display mode is activated to scan the gate lines in the sub-area A1 and afterward the touch mode is activated to scan the gate lines in the sub-area A1. Next, the display mode is activated to scan the gate lines in the sub-area A2 and after that the touch mode is activated to scan the gate lines in the sub-area A2. The multi-steps of the display and touch scanning are continued in such a way until the entire area of the display is driven once a operation period. It shall note that the touch mode can operate in the second or third scanning pattern that sequentially or simultaneously scans the gate lines in one divided area at least.

Figure 9:
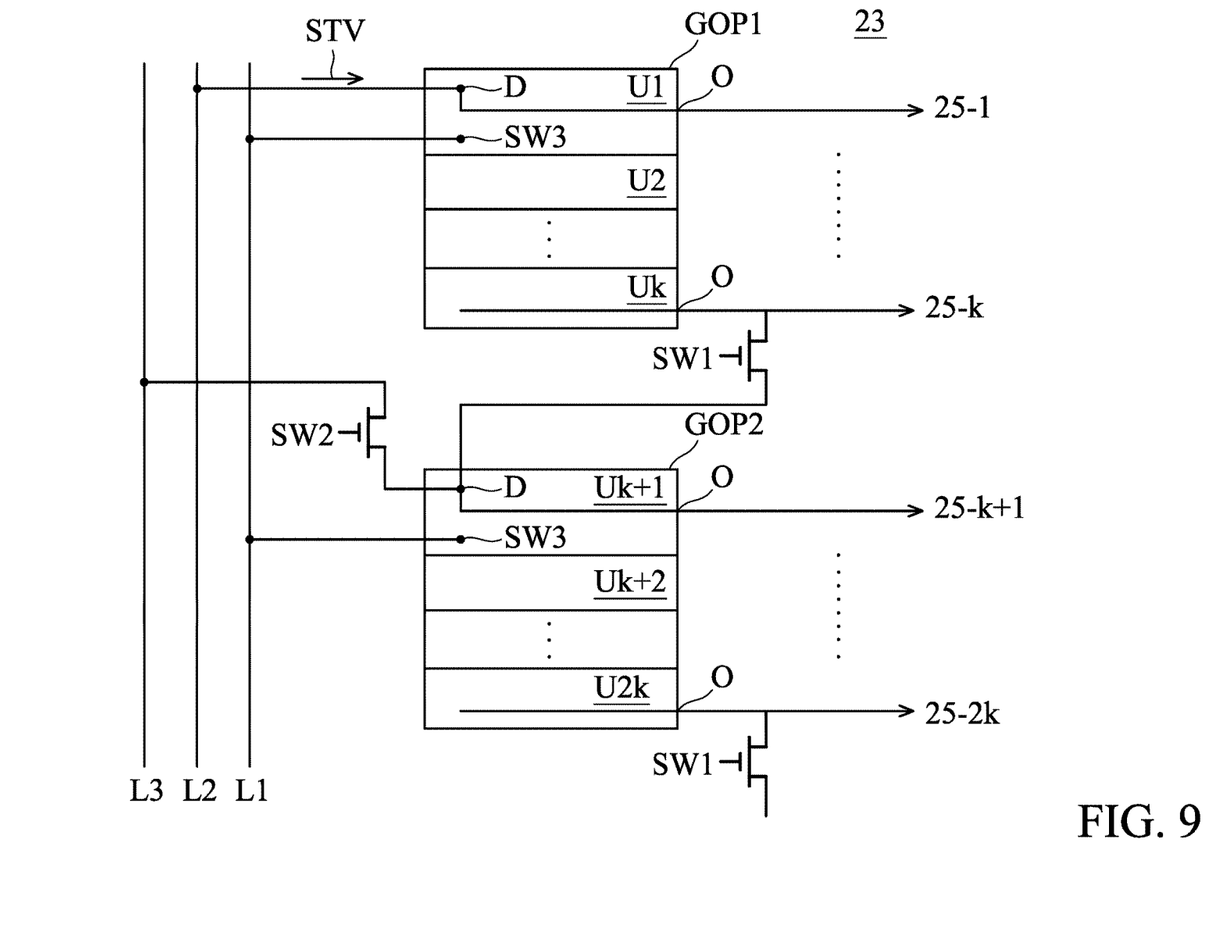
FIG. 9 is a schematic diagram showing a gate driving circuit of the invention.
Figure 10:
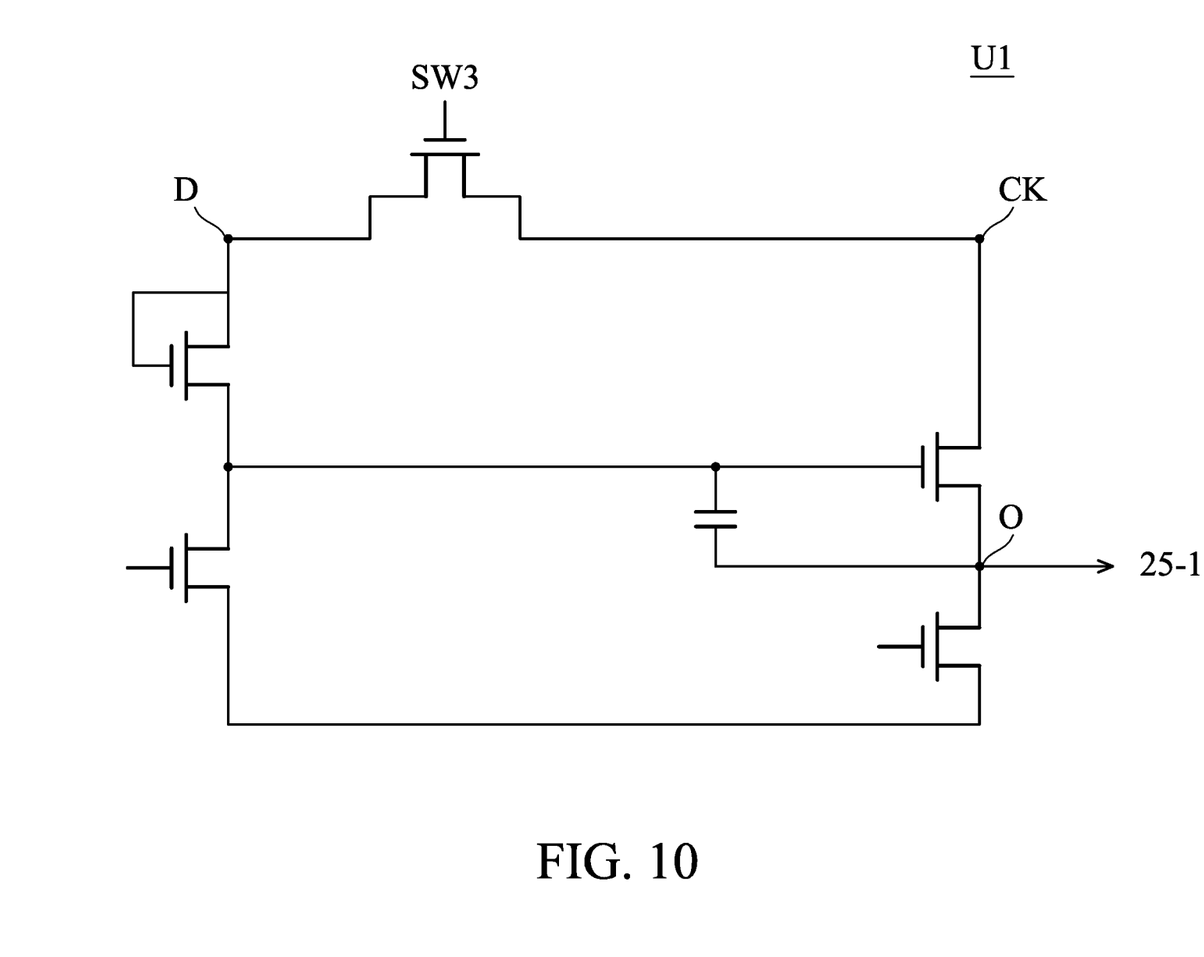
FIG. 10 is a basic circuit diagram of a gate line driving unit of the invention.

In the following paragraph, an embodiment of a gate driving circuit for the operation of the above three scanning schemes will be described. FIG. 9 is a schematic diagram of showing a gate driving circuit of the invention. FIG. 10 is a basic circuit diagram of a gate line driving unit of the invention. As shown in FIG. 9, the gate driving circuit 23 has a plurality of gate line driving blocks GOP1, GOP2, . . . connected in series (FIG. 9 shows only two gate line driving blocks GOP1 and GOP2 for brevity). Each gate line driving block, for an example of the gate line driving block GOP1, has k gate line driving unit U1, U2, . . . , Uk connected in series to respectively drive k gate lines 25-1, 25-2, . . . , 25-k. Each gate line driving unit, for an example of the gate line driving unit U1, has a basic circuit structure as shown in FIG. 10, which includes a trigger signal input terminal D, a clock signal input terminal CK, and an output terminal O. The trigger signal input terminal D is input with the signal output from the output terminal O of the gate line driving unit of the previous stage. But, the trigger signal input terminal D of the gate line driving unit U1, which is the first stage, is input with a trigger signal STV from a trigger signal line L2. The clock signal input terminal CK is input with a clock signal and the output terminal O outputs a scan signal to the gate line 25-1.

In the embodiment of the invention, three transistor switches SW1, SW2, and SW3 are disposed in the gate driving circuit 23 so as to achieve the operation of three touch scanning patterns. The switch SW1 is disposed between two adjacent gate line driving blocks, for an example of the gate line driving blocks GOP1 and GOP2. One of the joints of the switch SW1 is connected to the output terminal O of the gate line driving unit Uk, which is the last stage in the gate line driving block GOP1. The other of the joints of the switch SW1 is connected to the trigger signal input terminal D of the gate line driving unit Uk+1, which is the first stage in the gate line driving block GOP2. By this design, the switch SW1 is able to control the gate line driving block GOP2 to be driven in a sequence of the gate scanning after the gate line driving block GOP1 or in an independent frame of the gate scanning from the gate line driving block GOP1. The switch SW2 is connected with an external trigger signal line L3 and the trigger signal input terminal D of the gate line driving unit Uk+1, which is the first stage in the gate line driving block GOP2. Notably, a GOP driving block is corresponding to a switch SW2. FIG. 9 is shown as an example, but not a limitation. Numbers of switcher SW2 and external trigger lines are associated with the GOP driving blocks. But for the first gate line driving block GOP1, switcher SW2 is not necessarily designed to switch the trigger signal because of the trigger signal of the driving unit U1 directly from L2 line in the display and touch modes both. In order to simultaneously drive each driving unit of the gate line driving blocks, all of the driving units are connected to a respective trigger line L1. The switch SW3 is disposed in each driving unit U1 of gate line driving blocks and connected between the trigger input terminal D and the clock signal input terminal CK. When the switch SW3 is turn-on, all of the gate line driving units in the gate line driving block scan signals sequentially or simultaneously.

In cases where the touch mode adopts the first scanning pattern, the switch SW1 is turned on to sequentially scan the gate line driving block in the entire display area. That is, each gate line driving block continues to scan after the performance of the scanning of previous gate line driving block. In the meantime, the switchers SW2 and SW3 are turned-off to avoid the error of the scanning sequence. Therefore, the touch mode is performed by scanning the first gate line to the last gate line in the display area.

In cases where the touch mode adopts the second scanning scheme, the switch SW1 is turned off to make each gate line driving block being independent of the others. The switch SW2 is turned-on to execute an action that each of gate line driving blocks receives a respective trigger signal. The first driving unit starts the sequential scanning of the gate lines in the independent driving block in which touch mode of the display acts. The switch SW3 is also turned off for the sequential scan of the gate lines in each gate line driving block. Notably, the driving blocks can be independently selected to operate the touch mode of the display. One or more one driving block would operate simultaneously and systematically.

In cases where the touch mode adopts the third scanning scheme, the switch SW1 is off to make each of gate line driving blocks being independent of the others. The switch SW2 is turned on to make sure that each gate line driving block receives a respective trigger signal. The switch SW3 is also turned on to simultaneously scan all of the gate lines in each gate line driving block. Notably, the display can systematically scan the gate lines in specific gate driving blocks where trigger signals act on.

By disposing the above switches in the gate driving circuit constituted of thin film transistors which have an active layer made of amorphous silicon, poly-silicon or oxide semiconductor, the three scanning schemes for the touch mode in accordance with the invention can be actually realized.

Figure 11:
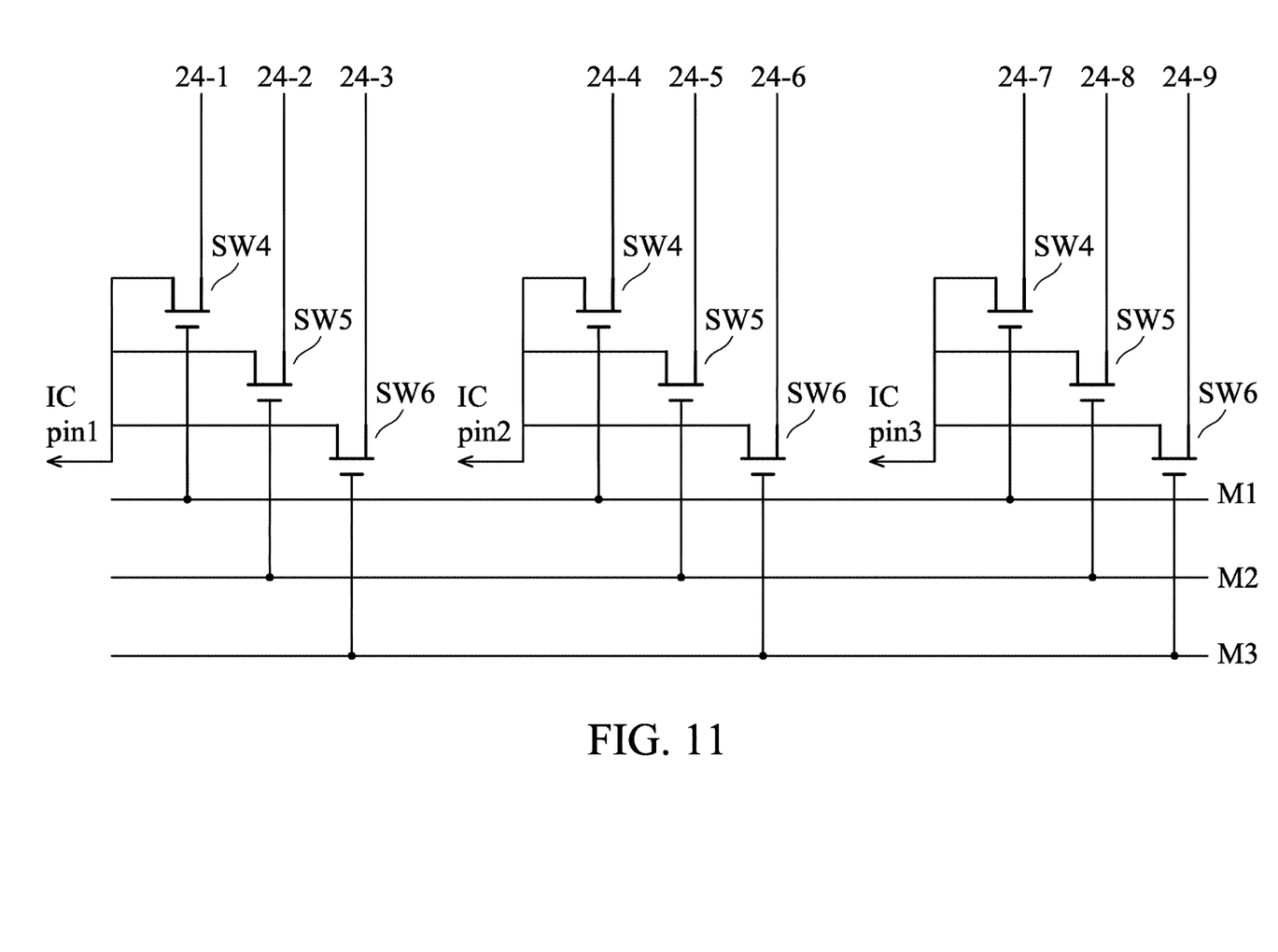
FIG. 11 is a schematic structure diagram of a data line partitioning output circuit of the invention.

Lastly, the data lines can also delivers touch signals simultaneously or locally in accordance with the invention. FIG. 11 is a schematic structure diagram of a data line partitioning output circuit of the invention. The circuit of FIG. 11 can be formed on the panel and locate at, for example, the position between the display area 21 and the data driving circuit 22 that are shown in FIG. 1. As shown in FIG. 11, a plurality of adjacent data lines can form a group. For example, each group has three adjacent data lines. Each group includes three switches. One of the joints of the three switches is connected to a data line and the other joint is connected to a pin of the data driving circuit. The control terminals of the three switches are connected to three respective control signal lines. The first group is used as an example. There are three data lines 24-1, 24-2, and 24-3, and three switches SW4, SW5, and SW6 respectively connected to the three data lines 24-1, 24-2, and 24-3. The other joints of the switches SW4, SW5, and SW6 are commonly connected to a pin (IC pin1) of the data driving circuit (for example the data driving circuit 22 shown in FIG. 1). The control terminals of the switches SW4, SW5, and SW6 are respectively connected to control signal lines M1, M2, and M3. Similarly, the arrangement of the second group is almost the same as the first group, only that the other joints of the switches SW4, SW5, and SW6 are commonly connected to another pin (IC pin2) of the data driving circuit.

In the above structure, there are three methods to output the touch driving signal VT to the data lines. The first method is that the control signal lines M1, M2, and M3 turn on all switches, and the pins (IC pin1, IC pin2, and IC pin3) of the data driving circuit delivers the touch driving signals VT simultaneously. Then the pins (IC pin1, IC pin2, and IC pin3) of the data driving circuit receive the touch sensing signals VR from the data lines.

The second method is that one of the control signal lines M1, M2, and M3 turns on the corresponding switch and the other control signal lines turn off the corresponding switches. The pins (IC pin1, IC pin2, and IC pin3) of the data driving circuit deliver the touch driving signals VT simultaneously. Therefore, one of designated data lines in each group outputs the touch driving signal VT. For example, the control signal line M1 turns on the switch SW4 in each group and the control signal lines M2 and M3 turn off the switches SW5 and SW6 in each group. The pins (IC pin1, IC pin2, and IC pin3) of the data driving circuit deliver the touch driving signals VT simultaneously. In this route, the data lines 24-1, 24-4, and 24-7 transmit the touch driving signals VT simultaneously. Then the pins (IC pin1, IC pin2, and IC pin3) of the data driving circuit receive the touch sensing signals VR from the data lines 24-1, 24-4, and 24-7.

The third method is that the control signal lines M1, M2, and M3 turn on all switches, and the pins (IC pin1, IC pin2, and IC pin3) of the data driving circuit can independently determine which one to deliver the touch driving signal VT. Then the pins (IC pin1, IC pin2, and IC pin3) of the data driving circuit receive the touch sensing signals VR from the data lines.

According to the embodiments, the invention provides a touch display panel and a driving method of its touch mode, capable of reducing coupling capacitance between the touch sensing electrodes and other wiring circuits and providing not only a normal touch function but also a fingerprint identification function, without additional wires for transmitting the common voltage, the touch driving signal, and the touch sensing signal.

While the invention has been described by examples and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display panel, comprising:
   a plurality of pixels disposed in an active area, each pixel comprising:
   a pixel electrode;
   a first switching element connected between the pixel electrode and a data line; and
   a common electrode corresponding to the pixel electrode and connected to a common electrode line,
   wherein in a display mode, the data line supplies a data signal to the pixel electrode via the first switching element, and the common electrode line supplies a first voltage level to the common electrode, wherein the first voltage level is a constant value, and
   wherein in a touch mode, the data line supplies a touch driving signal to the pixel electrode via the first switching element and receives a touch sensing signal from the pixel electrode, and the common electrode is a second voltage level, wherein the second voltage level is floating, and
   the touch display panel further comprises:
   a plurality of sixth switching elements respectively connected to the corresponding data lines;
   a plurality of control signal lines connected to control terminals of the sixth switching elements; and
   a touch signal output terminal connected to the sixth switching elements.

2. The touch display panel as claimed in claim 1, further comprising:
   a plurality of first gate lines connected to the first switching elements of the corresponding pixels.

3. The touch display panel as claimed in claim 1, wherein the pixel further comprises:
   a second switching element connected between the common electrode and the common electrode line,
   wherein in the display mode the second switching element keeps turning on, and in the touch mode the second switching element keeps turning off.

4. The touch display panel as claimed in claim 1, further comprising:
   a second switching element disposed in a peripheral area, wherein the peripheral area is located adjacent to the active area and the second switching element connects the common electrode lines connected to a portion of the pixels.

5. The touch display panel as claimed in claim 2, wherein the active area comprises a plurality of sub-areas, and each sub-area comprises a plurality of first gate lines,
   wherein in the touch mode, the sub-areas can be driven independently.

6. The touch display panel as claimed in claim 2, wherein in the touch mode, the first gate lines in the active area are scanned sequentially.

7. The touch display panel as claimed in claim 5, wherein in the touch mode the sub-areas are driven independently and the first gate lines in each sub-area are scanned sequentially.

8. The touch display panel as claimed in claim 5, wherein in the touch mode the sub-areas are driven independently and the first gate lines in each sub-area are scanned simultaneously.

9. The touch display panel as claimed in claim 5, wherein the sub-areas are driven in the display mode and the touch mode sequentially.

10. The touch display panel as claimed in claim 5, further comprising:
    a plurality of gate line driving blocks, each of which comprises a plurality of gate line driving units connected in series, wherein the gate line driving units are used to drive the first gate lines,
    a plurality of trigger signal lines corresponding to the gate line driving blocks, and
    a common signal line,
    wherein each gate line driving unit comprises a clock signal input terminal, a trigger signal input terminal, and an output terminal,
    a third switching element is connected between the trigger signal input terminal of the gate line driving unit which is the first stage in the gate line driving block and the output terminal of the gate line driving unit which is the last stage in the previous gate line driving block,
    a fourth switching element is connected between the trigger signal input terminal of the gate line driving unit which is the first stage in the gate line driving block and a corresponding one of the trigger signal lines, and
    each gate line driving unit further comprises a fifth switching element connected between the clock signal input terminal and the trigger signal input terminal, wherein control terminals of all the fifth switching elements are commonly connected to the common signal line.

11. The touch display panel as claimed in claim 10, wherein in the touch mode the first gate lines in the active area are scanned sequentially,
    wherein the third switching element is turned on, and the fourth switching element and the fifth switching element are turned off.

12. The touch display panel as claimed in claim 10, wherein in the touch mode the sub-areas are driven independently and the first gate lines in each sub-area are scanned sequentially,
    wherein the fourth switching element is turned on, and the third switching element and the fifth switching element are turned off.

13. The touch display panel as claimed in claim 10, wherein in the touch mode the sub-areas are driven independently and the first gate lines in each sub-area are scanned simultaneously,
    wherein the third switching element is turned off, and the fourth switching element and the fifth switching element are turned on.

14. The touch display panel as claimed in claim 1, wherein in the touch mode the control signal lines turn on the sixth switching elements simultaneously, and the touch signal output terminal outputs the touch sensing signal.

15. The touch display panel as claimed in claim 1, wherein in the touch mode the control signal lines turn on the sixth switching elements sequentially, and the touch signal output terminal outputs the touch sensing signal.

16. A driving method of a touch mode used to drive the touch display panel as claimed in claim 5, comprising:
  selectively activating a touch function or a fingerprint identification function,
  wherein when the touch function is activated, the sub-areas are driven independently and the first gate lines in each sub-area are scanned simultaneously, and
  when the fingerprint identification function is activated, the first gate lines in the display area are scanned sequentially, or the sub-areas are driven independently and the first gate lines in each sub-area are scanned sequentially.

17. The driving method as claimed in claim 16, further comprising:
  determining whether the touch function is performed on a specific area,
  wherein if the touch function is performed on a specific area, the sub-areas are driven independently and the first gate lines in each sub-area are scanned sequentially, and
  if the touch function is performed on the entire display area, the first gate lines in the display area are scanned sequentially.

* * * * *